June 8, 1948. K. J. KNUDSEN 2,443,073

TEMPERATURE COMPENSATED ELECTRICAL BRIDGE CIRCUIT

Filed March 17, 1944

INVENTOR
KNUD J. KNUDSEN
BY
John N. Leonard
ATTORNEY

Patented June 8, 1948

2,443,073

UNITED STATES PATENT OFFICE 2,443,073

TEMPERATURE COMPENSATED ELECTRICAL BRIDGE CIRCUIT

Knud J. Knudsen, Waterbury, Conn., assignor to The Lewis Engineering Company, Naugatuck, Conn., a corporation of Connecticut Application March 17, 1944, Serial No. 526,888

12 Claims. (Cl. 171—95)

This invention generally relates to electrical bridge circuits, and more particularly to an improved Wheatstone bridge circuit and electrical meter combination arranged to provide a remote indication of a physical condition, such as temperature, pressure or the like, variations of which can be quantitatively expressed by a change in an electrical quantity.

Meters having their operating element or elements energized by currents flowing in an unbalanced Wheatstone bridge circuit have been used for the remote indication of changes in a physical condition such as hydraulic pressure, temperature, light intensity and the like. Without intending to limit the present invention to the particular embodiment shown in the drawings, the new circuit is described herein as applied to a remote temperature indicator for aircraft service wherein wide variations of ambient temperature are experienced and wherein interchangeability of parts from instrument to instrument is of great advantage. Also, it is desirable in such installations that not only necessary adjustments of the instrument be reduced to a minimum, but that provision be made so that such adjustments as are necessary can be simply and speedily completed.

The bridge circuit of this invention is designed for use with a direct current ratio meter having a restoring coil and a deflecting coil movable together in a common magnetic field. As shown in my copending application, Serial No. 458,481, filed September 15, 1942, now Patent No. 2,391,168, dated December 18, 1945, of which this application is a continuation in part, a ratio meter of this type may have its deflecting coil connected across the galvanometer terminals of a Wheatstone bridge and its restoring coil connected in one of the arms of the bridge. In accordance with the teachings of said application, adjustment of the zero reading of the meter is made by varying the resistance in one of the arms of the bridge other than the one including the restoring coil, and adjustment of the full-scale reading of the meter is made by varying a resistor connected in a shunt path around the restoring coil.

In many installations of such bridge circuits and particularly in installations on aircraft, it is desirable that the bridge be substantially preadjusted and that as many parts as possible be interchangeable from instrument to instrument without greatly disturbing the bridge balance. In accordance with the present invention a means is provided for adjusting the full scale reading of the meter without materially disturbing the bridge balance, and thereby fixed resistors may be used in those arms which do not include the condition responsive resistor. A potentiometer of relatively low resistance is used in the deflecting coil circuit to adjust for the zero reading of the meter, and the full-scale adjustment means also includes a potentiometer of relatively low resistance. No adjustable resistors of relatively high resistance are required, and any variations in the resistance of the interchangeable fixed resistors may readily be compensated for by simple adjustment of the potentiometers.

Objects of the present invention include the provision of an improved bridge circuit; the provision of an improved circuit for the remote indication of a physical condition; the provision of a bridge circuit and ratio meter combination with improved means for zero and full-scale adjustments; the provision of improved combination means, in a meter and bridge circuit, for effecting compensation for changes in ambient temperature at the meter and for effecting full-scale adjustment of the meter without materially altering the bridge balance; and the provision of a bridge and ratio meter combination with means for independently adjusting the current flowing through the deflecting and restoring coils, the latter without disturbing the bridge balance.

Other objects and advantages of this invention will become apparent from the following specification, wherein reference is made to the drawing in which.

Figure 1:
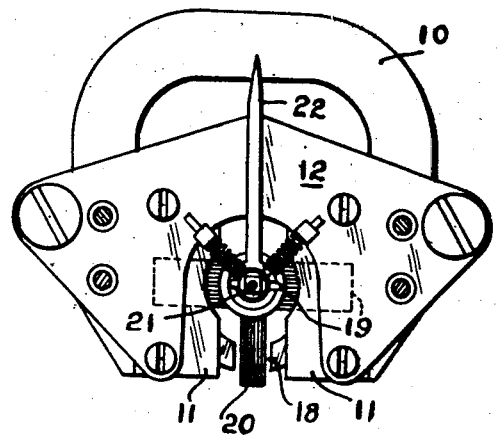
Fig. 1 is a plan view of a meter of the type useable with this invention.
Figure 2:
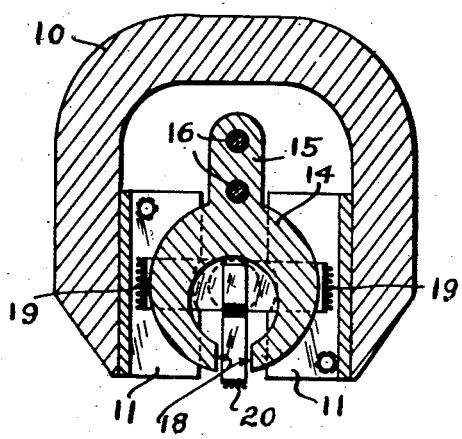
Fig. 2 is a horizontal sectional view taken through the coils and permanent magnets of the meter of Fig. 1.

Referring first to Figs. 1 and 2, a suitable meter for use with the circuit of this invention comprises a permanent, horseshoe shaped magnet 10 for which generally channel-like soft iron pole pieces 11 are provided. The pole pieces 11 are fixedly secured to a non-magnetic top plate 12 to which is fastened a soft iron core 14 of eccentric annular shape. The core 14 has an integral extension 15 through which non-magnetic bolts 16 are passed to secure the core to the plate 12. The core 14 is provided with an air gap 18.

A moving coil assembly of the meter comprises a deflecting coil 19 and a restoring coil 20. The coils 19 and 20 lie between substantially the same spaced parallel planes, have their respective axes disposed at right angles to each other, and are secured to a common rotatable shaft means 21. A pointer 22 is fixedly secured to the shaft 21 and is arranged to cooperate in the usual manner with a suitable scale (not shown).

Opposing sides of the deflecting coil 19 lie between the pole pieces 11 and the core 14 while the restoring coil 20 lies within the air gap 18. Current flowing in the coil 19 tends to move the pointer 22 to one side or the other of a central zero position and current flowing in the coil 20 tends to move the pointer to the zero position.

A meter of the type illustrated in Figs. 1 and 2 is described and claimed in my aforementioned application, but other suitable meters of this general character may be used if desired so long as they have a deflecting coil or equivalent means for causing a pointer to move to one side, or to one side or the other of a zero position, whether outside of or within the scale, against the bias of a restoring force provided by a restoring coil or equivalent means.

Figure 3:
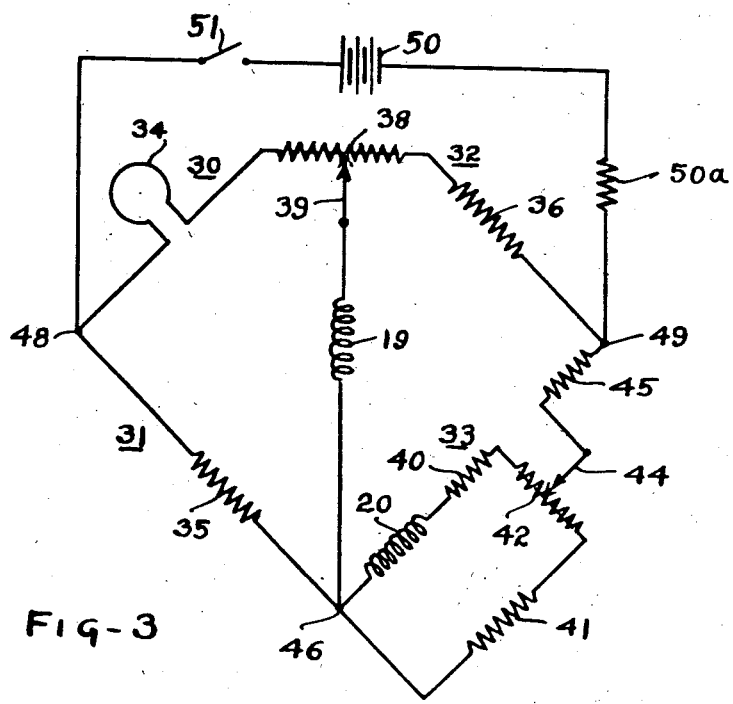
Fig. 3 is a schematic diagram of the bridge circuit and meter combination.

Referring now to Fig. 3, there is shown a bridge circuit including the usual four arms or branches 30 to 33, inclusive. The arm 30 comprises a resistance element 34 representative of a resistor which is variable in accordance with changes in temperature, either due to its inherent characteristics or in response to mechanical or other means interposed between the element 34 and a means (not shown) directly responsive to temperature. Resistance elements such as 34 are well known in the art and detailed description thereof is not necessary for an understanding of the invention.

The arms 31 and 32 comprise fixed resistors 35 and 36, respectively, which are preferably formed of a material such as manganin having a zero or negligible temperature coefficient of resistance. The arms 30 and 32 are electrically interconnected in series through a potentiometer 38 of relatively low resistance and having an adjustable intermediate connection indicated by slider 39.

One portion of the arm 33 comprises the restoring coil 20 of a meter such as shown in Figs. 1 and 2 and a fixed resistor 40 connected in series. The series combination of the coil 20 and the resistor 40 is connected in parallel with a series circuit including a fixed resistor 41 and a potentiometer 42 of relatively low resistance having an adjustable intermediate connection indicated by a slider 44. The slider 44 is connected to one end of a fixed resistor 45. The resistors 40, 41, and 45 as well as the potentiometers 38 and 42 are preferably of a material such as manganin having a negligible temperature coefficient of resistance.

The meter coils 19 and 20 are of the usual copper wire which has a substantial temperature coefficient of resistance.

The circuit comprising the resistor 41 and portion of the potentiometer 42 connected with the said resistor functions as a by-pass or shunt around the circuit including the restoring coil 20, resistor 40, and portion of the potentiometer connected with the resistor 40.

The potentiometers 38 and 42 are the only adjustable elements of the circuit and may be of the slide wire type.

Since, as stated above, the potentiometers 38 and 42, are of relatively low resistance as compared with the resistors 36, 41 and 45, the latter may be termed resistors of relatively high value.

The bridge arms 33 and 31 are electrically interconnected in series, a bridge terminal 46 being defined at the point of junction of the two arms. Additional bridge terminals 48 and 49 are defined by connecting the remote terminals of the arms 30 and 32 to the non-common terminals of the ratio arms 31 and 33, respectively. The deflecting coil 19 is connected between the terminal 46 and the slider 39 without the interposition of any resistors or equivalent devices; and for convenience I term such a connection a "direct" connection. A suitable source of electrical energy such as a battery 50 is connected across the terminals 48 and 49. A switch 51 may be interposed in the battery circuit if desired, and a current limiting resistor 50a if necessary or desired.

Since in a conventional Wheatstone bridge the pair of diagonally opposite terminals not connected to the battery are normally connected to the galvanometer, I term the terminal 46 and slider 39 across which the coil 19 is connected, the "galvanometer" terminals.

Assuming that the variable elements of the circuit of Fig. 3 are properly adjusted and that the temperature capable of causing a variation in the resistance of the element 34 is at its normal value, closure of the switch 51 causes the pointer 22 to move to the center of the scale in which position the restoring coil 20 lies centrally of the air gap 18 as shown in Fig. 1. Under these conditions the bridge is balanced, and no current flows in the deflecting coil 19. If the temperature to be indicated by the instrument varies so as to alter the resistance of the element 34, the bridge becomes unbalanced and current consequently flows through the deflecting coil 19 causing movement of the pointer 22 to the right or left of the central position depending upon whether the temperature increased or decreased from its normal value. The extent of such movement of the pointer is substantially proportional to the amount of change in the resistance of the element 34, and thus an accurate temperature indication is provided.

In the circuit of my above mentioned application, a deflecting coil and a restoring coil of a ratio meter are connected across the galvanometer terminals and in an arm of a Wheatstone bridge circuit, respectively, in somewhat the same manner as in the instant application, but a variable resistor or potentiometer is connected directly in parallel with the restoring coil. The variable resistor functions to provide an adjustment for the full scale reading of the ratio meter and, since formed of material having a negligible coefficient of resistance, also serves to by-pass current from the restoring coil to prevent a change in temperature of both coils from disturbing the accuracy of the meter response. This latter function is necessary since without such by-pass, a change in ambient temperature resulting in a given percentage of change in the resistance of the deflecting coil, which is not connected in series with a zero temperature coefficient resistor, would have a greater effect upon the meter reading than a similar percentage of change in the resistance of the restoring coil, which is connected in series with such a resistor.

However, adjustment of the potentiometer of my prior application to change the full scale reading of the meter resulted in an unbalance of the bridge and thereby required the use of a variable resistor in one of the other bridge arms to set the meter at the zero position for normal conditions. It is desirable for ease of repairing instruments in the field that the relatively high resistors in the other arms be fixed in value so that they be moved from instrument to instrument at will.

In the present invention the resistors 40, 41 and 45 as well as the resistors 35 and 36 are all fixed resistors of standard values thereby requiring no adjustment and being interchangeable from instrument to instrument without substantial change in bridge balance. As already indicated, whatever slight unbalance of the bridge is caused by commercial variations in the values of the said fixed, interchangeable resistors can be quickly and readily compensated for by adjustment of the potentiometer 38. As a result, the total number of adjustments which are required in the device of the present invention are held to a minimum, being two in number, and comprising the potentiometer 38 which adjusts for the zero reading of the meter, and the potentiometer 42 which adjusts for the full scale reading of the meter. However, since the resistors 35 and 36 are both of fixed value, the resistance of the arm 33 must remain substantially constant while the full scale reading of the meter is altered. Consequently, it is necessary that the resistance of the circuit by-passing current from the restoring coil be variable without materially altering the total resistance of the ratio arm 33. This result is accomplished by the parallel circuit comprising the coil 20, the resistors 40 and 41, and the potentiometer 42. By moving the slider 44, greatly different full scale readings of the meter may be chosen with no substantial change in the total resistance of the arm 33.

Thus it is seen that the adjustment of the potentiometer 38 is independent of the adjustment of the potentiometer 42, so that adjustment of the latter does not necessitate readjustment of the former or of any other components in the circuit, and as a result the adjustment of the device is extremely simple and may be quickly effected.

Furthermore, since the zero temperature coefficient resistor 41 and a portion of the potentiometer 42 are at all times in parallel with the coil 20, automatic compensation is provided to nullify the effect of changes in ambient temperature, so that the ratio of the currents in the coils 19 and 20 and therefore the ratio of the torques exerted by the coils is held constant during changes in temperature, as in my prior application. It will be seen that for any rise of ambient temperature the resistance of the branch circuit comprising the restoring coil 20, resistor 40 and portion of the potentiometer 42 connected with the said resistor will increase by a greater percentage than the resistance of the branch circuit comprising the resistor 41 and portion of the potentiometer 42 connected with the resistor 41. As a result, the ratio of the current in the restoring coil to the current in the resistor 41 changes with each change in ambient temperature; this ratio becomes greater in value as the temperature rises, and becomes less as the temperature drops, and the organization is such that the percentage change in current in the restoring coil 20 is the same as the percentage change in current in the deflecting coil 19 for all changes of ambient temperature encountered in use. In addition, the automatic temperature compensation is rendered very uniform since any adjustment of the potentiometer 42 to cause a reduction of resistance in the branch of the parallel circuit containing the resistor 41 for the purpose of changing the full scale reading of the meter, results in an increase of resistance in series with the coil 20, and vice versa. This inverse variation of the resistances in series and in parallel with the coil 20 thus improves the temperature compensation effect of the by-pass circuit, while at the same time the circuit arrangement and relative values of the resistors and potentiometer in the arm 33 of the bridge are such as to enable the full scale meter reading to be adjusted by adjustment of the potentiometer 42 without materially disturbing the bridge balance.

In all cases the term zero temperature coefficient resistor means a resistor made from manganin, constantan, or operatively equivalent material with a negligible temperature coefficient of resistance.

I claim:

1. In an instrument of the direct current moving coil type, a Wheatstone bridge, a deflecting coil directly connected across the galvanometer terminals of the bridge, a restoring coil in one leg of said bridge, each of said coils having a substantial temperature coefficient of resistance, a zero temperature coefficient resistor in parallel with the restoring coil in said one leg and a resistor in said one leg in series with the parallel connection of the restoring coil and zero temperature coefficient resistor, and resistors in the other legs of the bridge respectively.

2. An electrical indicator comprising a Wheatstone bridge circuit, a ratio meter having a deflecting coil and a restoring coil, means connecting said deflecting coil directly across the galvanometer terminals of said bridge, means connecting said restoring coil in one of the arms of said bridge, a resistor in series with said restoring coil, and a by-pass circuit in parallel with said restoring coil including a fixed resistor of relatively high value and a variable resistor of relatively low value connected in series with said fixed resistor.

3. In an electrical device of the type wherein an instrumentality in one branch of a bridge circuit varies to cause a change in the current flowing in the deflecting coil of a ratio meter having its restoring coil connected in a branch of the bridge circuit and its deflecting coil shunted across a part of the bridge circuit, the combination with said bridge circuit and meter of a single adjustable resistor connected with the restoring coil, said resistor having a portion in series with said coil and another portion providing a shunt circuit around the coil, adjustment of the said resistor altering concurrently the said portions and the resistance values thereof.

4. An electrical instrument comprising a meter of the direct-current moving coil type, said meter having a pointer for cooperation with a scale; a balancing bridge circuit; a deflecting coil shunted directly across a part of the bridge circuit; a restoring coil connected in a branch of the bridge circuit, each of said coils having a substantial temperature coefficient of resistance; a first resistor, having a negligible temperature coefficient, shunted around the restoring coil, a second resistor, connected in the said branch of the bridge circuit, series-connected with the shunt connection of the said restoring coil and first resistor; and resistors in the other branches of the bridge circuit, the said pointer and deflecting and restoring coils of the meter occupying a predetermined position when the bridge is balanced, such that they are deflectable in either of opposite directions upon unbalance of the bridge.

5. An electrical instrument comprising a meter of the direct-current moving coil type; a balancing bridge circuit; a deflecting coil shunted directly across a part of the bridge circuit; a resoring coil connected in a branch of the bridge circuit, each of said coils having a substantial temperature coefficient of resistance; a resistance means having a negligible temperature coefficient, shunted around the restoring coil; a resistor in the said branch of the bridge circuit, connected in series with the shunt connection of the restoring coil and said resistor means; resistors in the other branches of the bridge circuit, respectively; and means for altering the resistance value of the said resistance means.

6. An electrical instrument comprising a meter of the direct-current moving coil type; a balancing bridge circuit; a deflecting coil shunted directly across a part of the bridge circuit; a restoring coil connected in a branch of the bridge circuit, each of said coils having a substantial temperature coefficient of resistance; resistors in the branches of the bridge circuit, respectively; and a resistance means connected with the restoring coil, a part of said means being in series with the coil and another part comprising a shunt circuit around the coil, said resistance means operating to divert a progressively increasing portion of the current of the branch circuit from the restoring coil as the ambient temperature rises and vice versa, thereby to maintain the ratio of the currents in the deflecting and restoring coils fixed so that the torques of the said coils have a fixed ratio regardless of changes in ambient temperature.

7. An electrical instrument comprising a meter of the direct-current moving coil type, a balancing bridge circuit; a deflecting coil shunted directly across a part of the bridge circuit; a restoring coil connected in a branch of the bridge circuit, each of said coils having a substantial temperature coefficient of resistance; and a resistor of negligible temperature coefficient, connected with the restoring coil and providing a shunt circuit around the said coil, the said resistor operating to divert a progressively increasing portion of the current of the branch circuit from the restoring coil as the ambient temperature rises and vice versa, thereby to maintain the ratio of the currents in the deflecting and restoring coils fixed so that the torques of the said coils have a fixed ratio regardless of changes in ambient temperature.

8. An electrical instrument comprising a balancing bridge circuit; a ratio meter having deflecting and restoring coils; means connecting the deflecting coil directly across a part of the bridge circuit; means connecting the restoring coil in one of the branches of the bridge circuit; a resistor in series with the restoring coil; and a shunt circuit around the restoring coil, including a fixed resistor of relatively high value and a variable resistor of relatively low value, the said resistors of the shunt circuit having negligible temperature coefficients of resistance.

9. In an electrical instrument, a meter of the direct-current moving coil type; a balancing bridge circuit; a deflecting coil connected directly across a part of the bridge circuit; a restoring coil in one branch of the bridge circuit, each of said coils having a substantial temperature coefficient of resistance; a first resistor, having a relatively high value, connected in series with the restoring coil; a second resistor, having a negligible temperature coefficient, connected with the restoring coil and providing a shunt circuit around the latter, said second resistor diverting a progressively increasing portion of the current of the said branch from the restoring coil upon rise in ambient temperature and vice versa, thereby maintaining the current flow in the restoring coil in a fixed ratio to that in the deflecting coil so that the torques of the respective coils have a constant ratio with changes in ambient temperature.

10. In an electrical instrument, a ratio meter having deflecting and restoring coils; a balancing bridge circuit, said deflecting coil being connected across a part of the bridge circuit and said restoring coil being connected in a branch of the bridge circuit; and single adjustable resistor of negligible temperature coefficient, connected with the restoring coil, said resistor having a portion in series with the coil and another portion providing a shunt circuit around the coil, adjustment of the said resistor altering concurrently the said portions and the resistance values thereof.

11. In an electrical instrument, a ratio meter having deflecting and restoring coils; a balancing bridge circuit, said deflecting coil being connected across a part of the bridge circuit and said restoring coil being connected in a branch of the bridge circuit; and a resistance means having a negligible temperature coefficient, connected with the restoring coil and providing a shunt circuit around the latter.

12. In an electrical instrument, a ratio meter having deflecting and restoring coils; a balancing bridge circuit, said deflecting coil being connected across a part of the bridge circuit and said restoring coil being connected in a branch of the bridge circuit; an adjustable resistor of relatively low resistance connected with the restoring coil, said resistor having a first portion in series with the coil and a second portion connected in a shunt circuit around the coil, adjustment of the said resistor altering concurrently the said portions and the resistance values thereof; and a resistor of relatively high resistance located in the said shunt circuit and series-connected with the second portion of the adjustable resistor, the latter and the resistor of relatively high resistance having negligible temperature coefficients of resistance.

KNUD J. KNUDSEN.

REFERENCES CITED

The following references are of record in the file of this patent:

UNITED STATES PATENTS

| Number | Name | Date |
|---|---|---|
| 1,901,343 | Eastham | Mar. 14, 1933 |
| 2,156,199 | Smith | Apr. 25, 1939 |
| 2,270,991 | Bagno | Jan. 27, 1942 |
| 2,346,683 | Hickok | Apr. 18, 1944 |

FOREIGN PATENTS

| Number | Country | Date |
|---|---|---|
| 543,587 | Germany | Feb. 10, 1932 |